(12) United States Patent
Jeong et al.

(10) Patent No.: US 11,505,905 B2
(45) Date of Patent: Nov. 22, 2022

(54) SELF-POWERED DELINEATOR INCLUDING LIGHTING-EMITTER

(71) Applicants: INITECH Co., LTD., Jinju-si (KR); KOREA INSTITUTE OF CERAMIC ENGINEERING AND TECHNOLOGY, Jinju-si (KR)

(72) Inventors: Young Hun Jeong, Jinju-si (KR); Young Jun Park, Incheon (KR); Min Seon Lee, Jinju-si (KR); Yong Hyeon Na, Changwon-si (KR)

(73) Assignees: INITECH CO., LTD., Jinju-si (KR); KOREA INSTITUTE OF CERAMIC ENGINEERING AND TECHNOLOGY, Jinju-si (KR)

( * ) Notice: Subject to any disclaimer, the term of this patent is extended or adjusted under 35 U.S.C. 154(b) by 671 days.

(21) Appl. No.: 16/664,036

(22) Filed: Oct. 25, 2019

(65) Prior Publication Data

US 2021/0087761 A1 Mar. 25, 2021

(30) Foreign Application Priority Data

Sep. 20, 2019 (KR) .................. 10-2019-0115828

(51) Int. Cl.
*E01F 9/608* (2016.01)
*H02N 2/18* (2006.01)
(Continued)

(52) U.S. Cl.
CPC .............. *E01F 9/61* (2016.02); *E01F 9/588* (2016.02); *F03D 9/46* (2016.05); *H02N 2/181* (2013.01); *F05B 2220/709* (2013.01)

(58) Field of Classification Search
CPC . E01F 9/61; E01F 9/588; H02N 2/181; F03D 9/46; F05B 2220/709
See application file for complete search history.

(56) References Cited

U.S. PATENT DOCUMENTS 10,526,056 B1 * 1/2020 Hakki .................... F03D 1/025
11,125,213 B1 * 9/2021 Yu ............................. F03D 9/46
(Continued)

FOREIGN PATENT DOCUMENTS

JP          07259029 A  * 10/1995
JP       2000212920 A  *  8/2000
(Continued)

*Primary Examiner* — Abigail A Risic
(74) *Attorney, Agent, or Firm* — Norton Rose Fulbright US LLP

(57) ABSTRACT

A self-powered delineator includes a wind-powered rotatable module; a first piezoelectric energy generator module for generating electrical energy; a second piezoelectric energy generator module for generating electrical energy; and a light-emitter. The wind-powered rotatable module includes one or more first magnets spacedly arranged around a rotation shaft. The first piezoelectric energy generator module includes one or more first piezoelectric elements, and one or more second magnets disposed on the at least one first piezoelectric element. The second piezoelectric energy generator module includes at least one elastic base extending radially from a fixed shaft in a cantilever manner; and at least one second piezoelectric element on the at least one elastic base.

16 Claims, 13 Drawing Sheets

(51) Int. Cl.
  *E01F 9/588*  (2016.01)
  *F03D 9/46*   (2016.01)

(56) References Cited

U.S. PATENT DOCUMENTS

| | | | |
|---|---|---|---|
| 2007/0264116 A1* | 11/2007 | Dempster | F03D 9/257 |
| | | | 415/4.2 |
| 2012/0292912 A1* | 11/2012 | Haskell | H02K 7/183 |
| | | | 290/55 |
| 2015/0086368 A1* | 3/2015 | Shekher | F03D 1/0675 |
| | | | 416/146 R |
| 2015/0115775 A1* | 4/2015 | Kim | F03D 5/06 |
| | | | 310/339 |
| 2016/0013737 A1* | 1/2016 | Yanez Villarreal | F03D 5/06 |
| | | | 310/339 |
| 2018/0102690 A1* | 4/2018 | Martinez Ruvalcaba | |
| | | | F03D 9/46 |
| 2019/0003458 A1* | 1/2019 | Uliano | H02K 7/183 |
| 2019/0085819 A1* | 3/2019 | Vu | F03D 80/00 |
| 2022/0136485 A1* | 5/2022 | Sanderson | H02K 7/183 |
| | | | 290/55 |

FOREIGN PATENT DOCUMENTS

| | | | |
|---|---|---|---|
| JP | 2009156035 A | * | 7/2009 |
| KR | 100915173 B1 | * | 8/2006 |
| KR | 20100036525 A | * | 9/2008 |
| KR | 20150118757 A | * | 10/2015 |
| KR | 20210040678 A | * | 10/2019 |
| KR | 102103083 B1 | * | 4/2020 |
| KR | 102320408 B1 | * | 6/2021 |

* cited by examiner

SELF-POWERED DELINEATOR INCLUDING LIGHTING-EMITTER

CROSS-REFERENCE TO RELATED APPLICATION

This application claims a benefit under 35 U.S.C. § 119(a) of Korean Patent Application No. 10-2019-0115828 filed on Sep. 20, 2019, on the Korean Intellectual Property Office, the entire disclosure of which is incorporated herein by reference for all purposes.

BACKGROUND

1. Field

The present disclosure relates to a self-powered delineator including a light-emitter. The delineator according to the present disclosure may be self-powered using micro wind power on a road and may turn on or off the light-emitter.

2. Description of Related Art

Generally, delineators are installed sequentially in a spaced manner along an edge line of a road and reflect light to define a road boundary so that a driver of a vehicle can recognize the road boundary.

That is, the delineator reflects light from a headlight of the vehicle toward the vehicle so that the driver of the vehicle recognizes the road boundary. In this case, the delineator may passively reflect the light from the headlight, and further may actively emit light.

In particular, when there is no street-lamp or in a very dark road, the delineator can emit light by itself to prevent an accident. However, there is a problem that a separate power supply is required when installing the delineator having the light emission function.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One purpose of the present disclosure is to propose a self-luminous delineator that does not require a separate power supply to turn on the delineator having the self-emission function.

Another purpose of the present disclosure is to propose a delineator as self-powered by using micro wind power on a road, such that a light-emitter of the delineator emits light without a separate power supply.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

A first aspect of the present disclosure provides a self-powered delineator comprising: a wind-powered rotatable module; a first piezoelectric energy generator module for generating electrical energy, wherein the first piezoelectric energy generator module is disposed above the wind-powered rotatable module; a second piezoelectric energy generator module for generating electrical energy; and a light-emitter, wherein the wind-powered rotatable module includes: a first top portion; a rotation shaft coupled to the first top portion; one or more rotating blades radially extending from the rotation shaft, wherein the blades are rotatable by wind power to rotate the rotation shaft; and one or more first magnets spacedly arranged around the rotation shaft and disposed on the first top portion, wherein the first piezoelectric energy generator module includes: a second top portion; one or more first piezoelectric elements, each first piezoelectric element extending downwardly from the second top portion in a cantilever manner; and one or more second magnets disposed on the at least one first piezoelectric element, wherein the second piezoelectric energy generator module includes: a fixed shaft; at least one elastic base extending radially from the fixed shaft in a cantilever manner; and at least one second piezoelectric element on the at least one elastic base, wherein the light-emitter is electrically connected to the first piezoelectric element and/or the second piezoelectric element such that the light-emitter is turned on using electrical energy generated from the first piezoelectric element and/or the second piezoelectric element.

In one implementation of the first aspect, the at least one first magnet includes a plurality of the first magnets, wherein each first magnet is oriented such that a north pole and a south pole thereof are arranged vertically or horizontally on the first top portion.

In one implementation of the first aspect, the at least one first piezoelectric element includes a plurality of first piezoelectric elements spacedly arranged around a center of the second top portion, wherein each first piezoelectric element extends radially from the center of the second top portion.

In one implementation of the first aspect, each second magnet is oriented such that a N pole and a S pole thereof are arranged vertically on one face or opposite faces of each first piezoelectric element.

In one implementation of the first aspect, each second magnet is oriented such that a N pole and a S pole thereof are arranged horizontally on one face or opposite faces of each first piezoelectric element.

In one implementation of the first aspect, each elastic base is divided into a plurality of sub elastic bases vertically arranged to be spaced apart from each other, wherein each piezoelectric element includes a plurality of second sub piezoelectric elements, each disposed on each sub elastic base.

In one implementation of the first aspect, a plurality of further light-emitters are disposed on the fixed shaft, wherein each further light emitter is electrically connected to each second sub piezoelectric element, wherein when each sub elastic base is vibrated in a cantilever manner, each further light emitter is turned on.

In one implementation of the first aspect, an insulating film is disposed on each sub elastic base, wherein an electrode pattern is formed on the insulating film to electrically connect each second sub piezoelectric element to each further light-emitter.

A second aspect of the present disclosure provides a self-powered delineator comprising: a wind-powered rotatable module; a first piezoelectric energy generator module for generating electrical energy, wherein the first piezoelectric energy generator module is disposed below the wind-powered rotatable module; a second piezoelectric energy generator module for generating electrical energy; and a light-emitter, wherein the wind-powered rotatable module includes: a first bottom portion; a rotation shaft coupled to the bottom portion; one or more rotating blades radially extending from the rotation shaft, wherein the blades are rotatable by wind power to rotate the rotation shaft; and one or more first magnets spacedly arranged around the rotation shaft and disposed on the bottom portion, wherein the first piezoelectric energy generator module includes: a second bottom portion; one or more first piezoelectric elements, each first piezoelectric element extending upwardly from the second bottom portion in a cantilever manner; and one or more second magnets disposed on the at least one first piezoelectric element, wherein the second piezoelectric energy generator module includes: a fixed shaft; at least one elastic base extending radially from the fixed shaft in a cantilever manner; and at least one second piezoelectric element on the at least one elastic base, wherein the light-emitter is electrically connected to the first piezoelectric element and/or the second piezoelectric element such that the light-emitter is turned on using electrical energy generated from the first piezoelectric element and/or the second piezoelectric element.

In one implementation of the second aspect, the at least one first magnet includes a plurality of the first magnets, wherein each first magnet is oriented such that a north pole and a south pole thereof are arranged vertically or horizontally on the first bottom portion.

In one implementation of the second aspect, the at least one first piezoelectric element includes a plurality of first piezoelectric elements spacedly arranged around a center of the second bottom portion, wherein each first piezoelectric element extends radially from the center of the second bottom portion.

In one implementation of the second aspect, each second magnet is oriented such that a N pole and a S pole thereof are arranged vertically on one face or opposite faces of each first piezoelectric element.

In one implementation of the second aspect, each second magnet is oriented such that a N pole and a S pole thereof are arranged horizontally on one face or opposite faces of each first piezoelectric element.

In one implementation of the second aspect, each elastic base is divided into a plurality of sub elastic bases vertically arranged to be spaced apart from each other, wherein each piezoelectric element includes a plurality of second sub piezoelectric elements, each disposed on each sub elastic base.

In one implementation of the second aspect, a plurality of further light-emitters are disposed on the fixed shaft, wherein each further light emitter is electrically connected to each second sub piezoelectric element, wherein when each sub elastic base is vibrated in a cantilever manner, each further light emitter is turned on.

In one implementation of the second aspect, an insulating film is disposed on each sub elastic base, wherein an electrode pattern is formed on the insulating film to electrically connect each second sub piezoelectric element to each further light-emitter.

Effects of the present disclosure are as follows but are not limited thereto.

According to the present disclosure, the delineator may self-powered using wind power generated by movement of a vehicle on a road or using natural wind, such that the light-emitter thereof may emit light without a separate power supply. This will have an effect of preventing an accident of a vehicle in a dark road.

In addition to the effects as described above, specific effects of the present disclosure are described together with specific details for carrying out the invention.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTIONS

Figure 1:
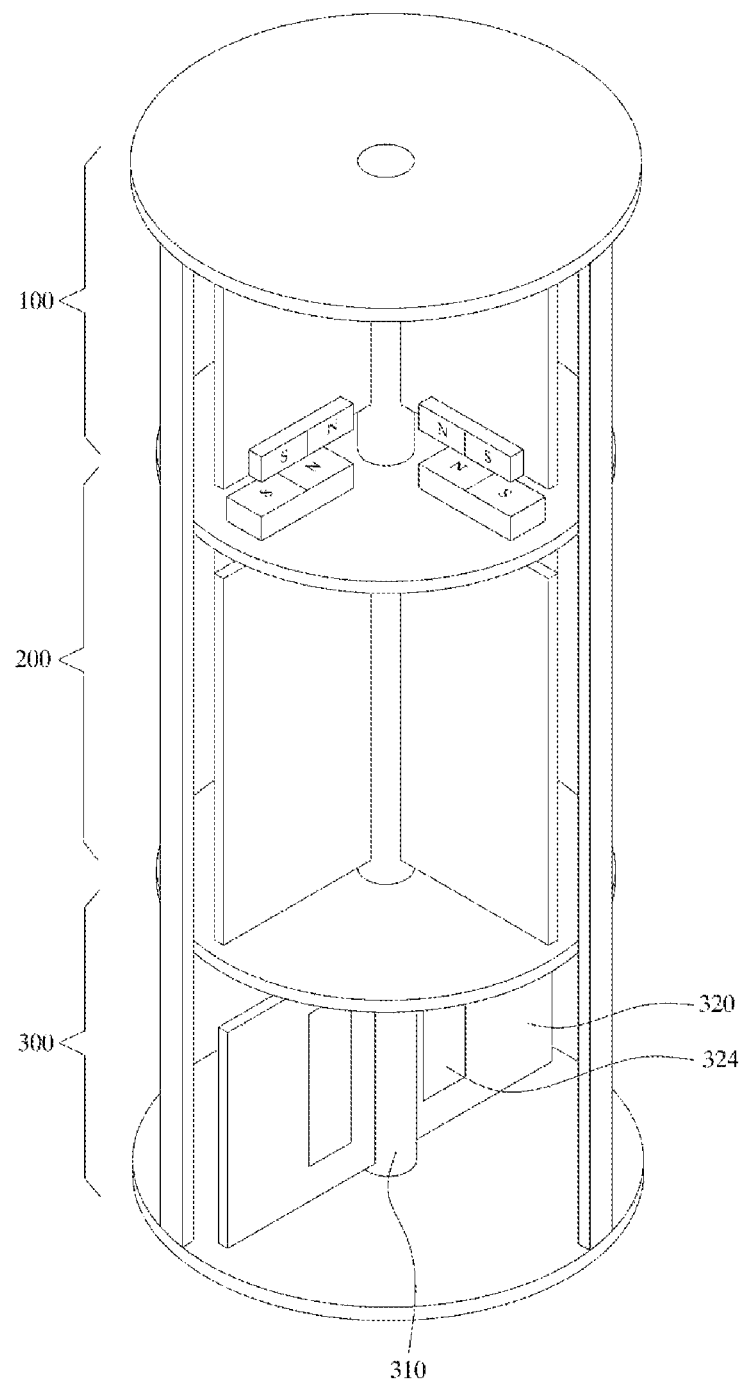
FIG. 1 shows a perspective view of a self-powered delineator using piezoelectric effect according to one embodiment of the present disclosure.

For simplicity and clarity of illustration, elements in the figures are not necessarily drawn to scale. The same reference numbers in different figures denote the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 shows a perspective view of a self-powered delineator using piezoelectric effect according to one embodiment of the present disclosure.

A self-powered delineator using an piezoelectric effect according to an embodiment of the present disclosure includes a wind-powered rotatable module 200 in which a rotation shaft is rotated by wind power; a first piezoelectric energy generator module 100 for generating electrical energy by at least one first piezoelectric element using a rotational force from the wind-powered rotatable module; a second piezoelectric energy generator module 300 for generating electrical energy by at least one second piezoelectric element disposed on an elastic base extending radially from a fixed central shaft in a cantilever manner; and a light-emitter (not shown).

The wind-powered rotatable module 200 has a rotary wing rotatable by wind power.

The first piezoelectric energy generator module 100 may be configured for generating electric energy using the piezoelectric effect while rotating by the rotational force from the wind-powered rotatable module. Due to the piezoelectric effect, rotational energy leading to mechanical deformation may be converted to electrical energy. This scheme of obtaining the electrical energy may employ magneto-piezoelastic effect in accordance with the present disclosure.

In the embodiment of the present disclosure, as the wind-powered rotatable module 200 rotates, first magnets disposed on a top face of the wind-powered rotatable module rotate. As the first magnets rotate, second magnets disposed on the piezoelectric element are vibrated by the magnetic field, such that the piezoelectric element vibrates, thereby generating electrical energy due to the piezoelectric effect.

Figure 2A:
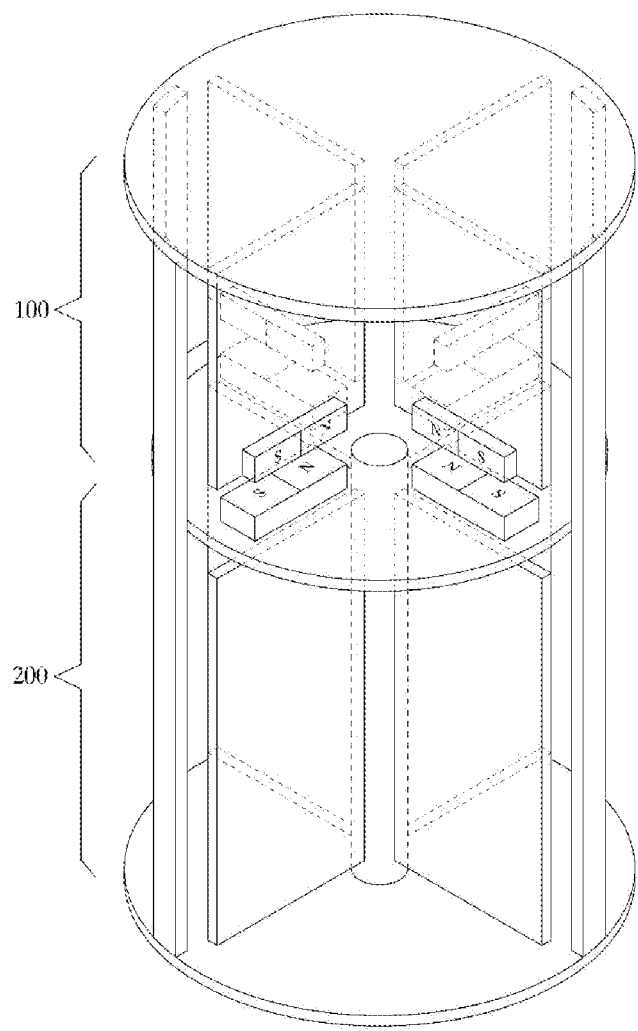
FIG. 2A and FIG. 2B show perspective views of a wind-powered rotatable module according to one embodiment of the present disclosure.
Figure 2B:
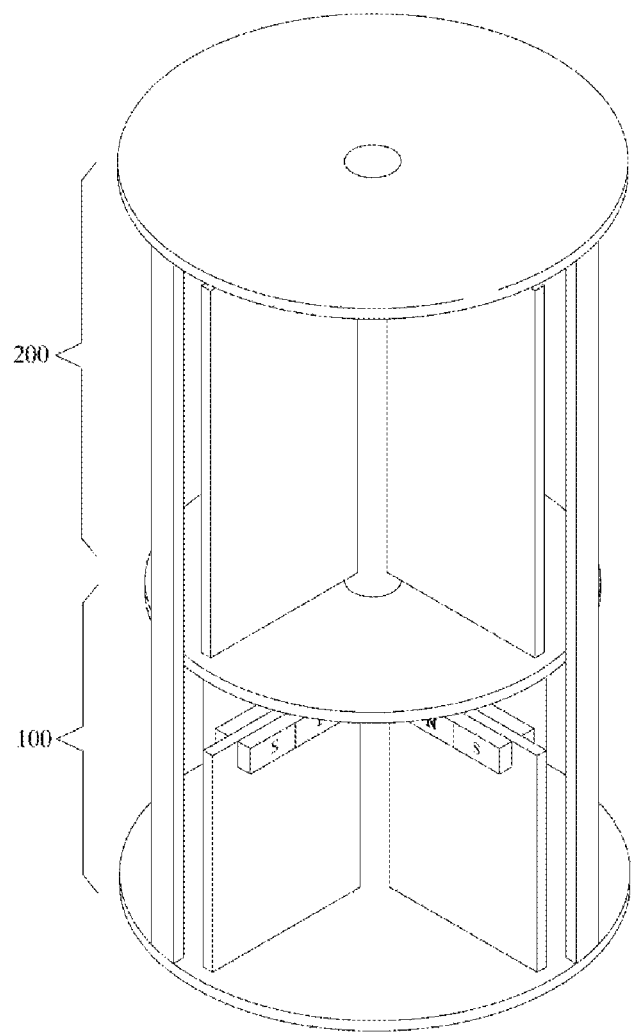

FIG. 2A and FIG. 2B show perspective views of a wind-powered rotatable module according to one embodiment of the present disclosure. FIG. 2A shows the first piezoelectric energy generator module placed above the wind-powered rotatable module. FIG. 2B shows the first piezoelectric energy generator module placed below the wind-powered rotatable module. The following description will be based on FIG. 2A. This description may be applied to the embodiment of FIG. 2B.

As shown in FIG. 2A, the wind-powered rotatable module has blades 220 extending radially from the rotation shaft 210. On the top face 230 of the wind-powered rotatable module, each of first magnets 240 extends radially from the rotation shaft. The first magnets are arranged in a spaced manner around the rotation shaft.

Figure 3A:
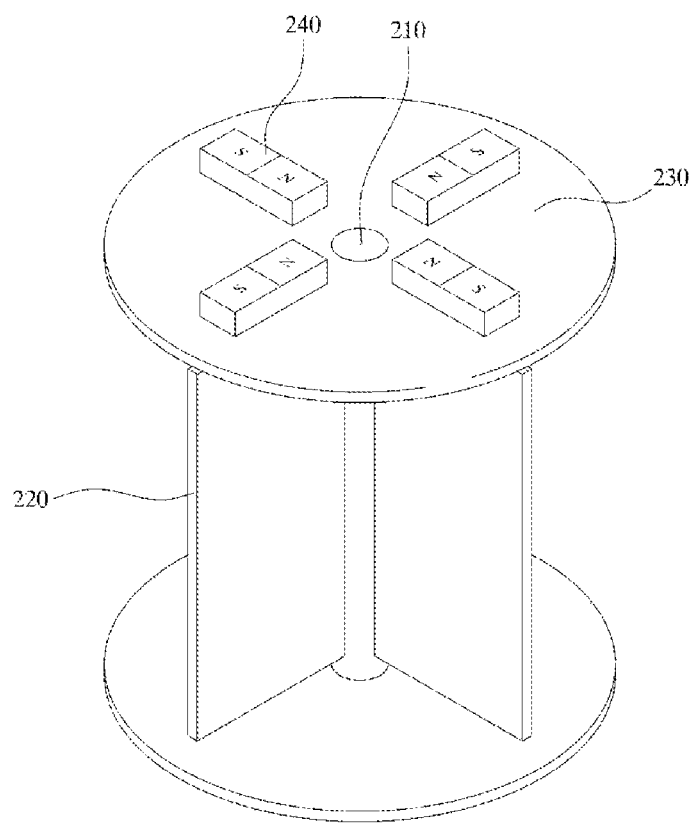
FIG. 3A to FIG. 3C show magnet arrangement on a top face of a wind-powered rotatable module according to one embodiment of the present disclosure.
Figure 3B:
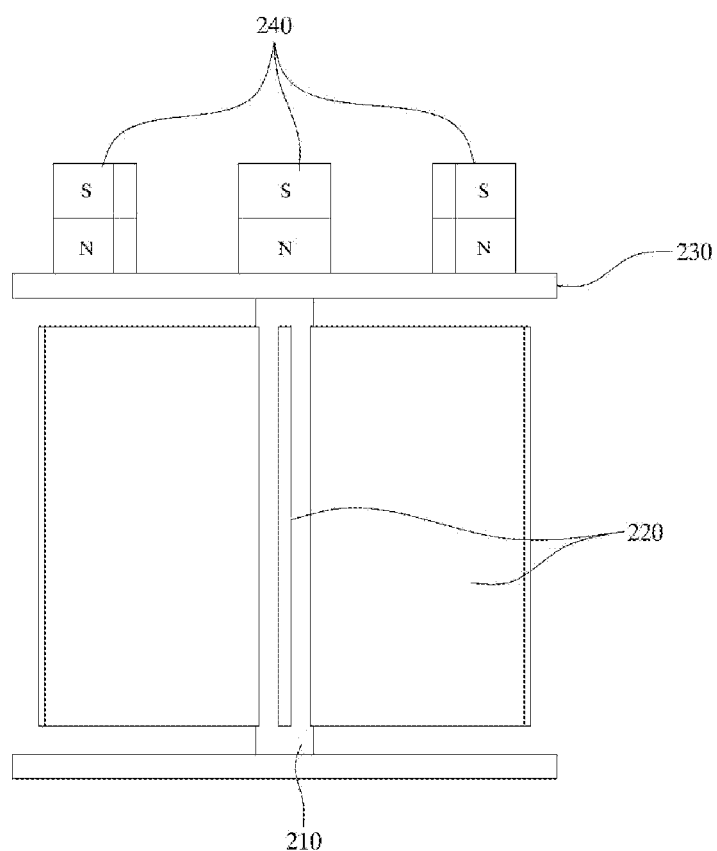
Figure 3C:
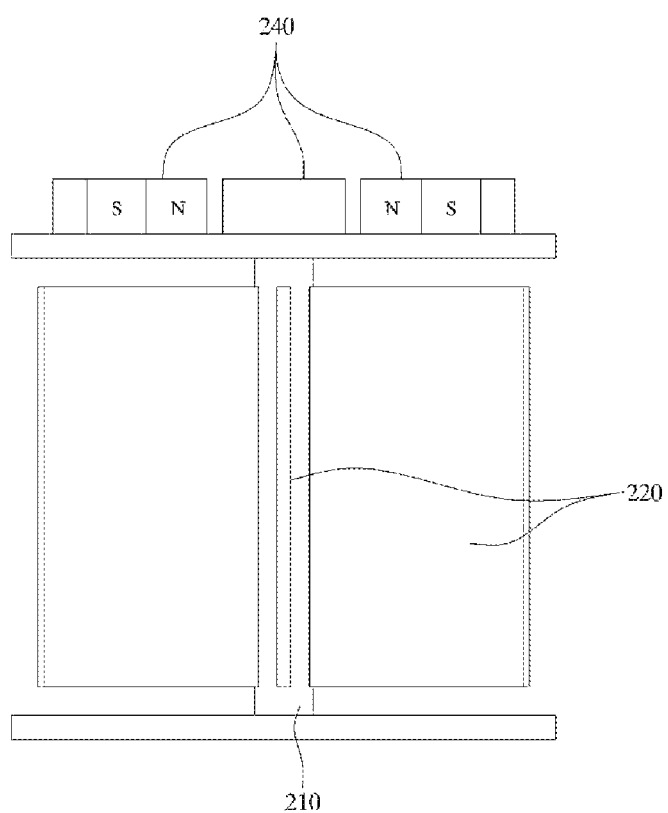

FIG. 3A to FIG. 3C show magnet arrangement on a top face of the wind-powered rotatable module according to one embodiment of the present disclosure.

In FIG. 3A, a plurality of first magnets 240 are disposed. The first magnet 240 is oriented so that a north pole and a south pole are arranged radially in a horizontal direction of the top face 230 of the wind-powered rotatable module. In FIG. 3B, a plurality of first magnets 240 are disposed. The first magnet 240 is oriented so that the north pole and the south pole are arranged perpendicularly to a horizontal direction of the top face 230 of the wind-powered rotatable module. In the embodiment of FIG. 3B, the north pole is disposed below the south pole. However, the present disclosure is not limited thereto. Preferably, the magnets are oriented such that the poles of the same polarity are oriented in the same direction as shown in FIG. 3B. In FIG. 3C, a plurality of first magnets 240 are disposed. The first magnet 240 is oriented so that a north pole and a south pole are arranged radially in a horizontal direction of the top face 230 of the wind-powered rotatable module. In the embodiment of FIG. 3C, the first magnets are oriented so that all of the N poles face toward the center shaft. However, the present disclosure is not limited thereto. Preferably, the magnets are arranged such that the poles of the same polarity are oriented in the same direction as shown in FIG. 3C.

Figure 5:
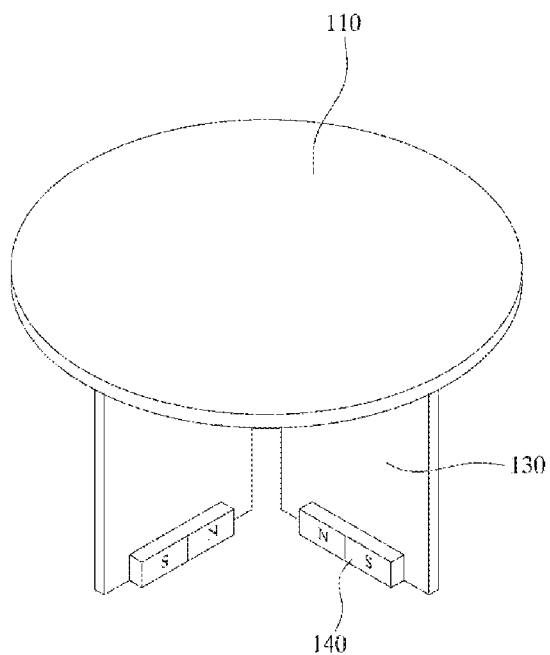
FIG. 5 shows a perspective view of a first piezoelectric energy generator module according to one embodiment of the present disclosure.

FIG. 5 shows a perspective view of a first piezoelectric energy generator module according to one embodiment of the present disclosure. As shown in FIG. 5, the first piezoelectric energy generator module 100 includes a plurality of first piezoelectric element L 130, each having one end fixed to the top face 110 and the other end being a free end. The first piezoelectric element may extend in a cantilever manner. In one example, an elastic substrate may extend in a cantilever manner from the top face and The piezoelectric element may be disposed on one face or both opposite faces.

The piezoelectric element may be configured in a cantilever manner. Thus, the piezoelectric element may vibrate continuously such that the electric energy can be continuously obtained. In accordance with the present disclosure, the piezoelectric element is preferably arranged in the form of cantilever. The cantilever form may include unimorph, bimorph, trimorph and the like.

A second magnet 140 may be disposed on the piezoelectric element 130. The second magnets may be affected by the magnetic influence of the first magnets 240 due to the rotation of the wind-powered rotatable module, such that the piezoelectric element vibrates accordingly. Further, the second magnet acts as a mass by itself, thereby to further increase the vibration.

As shown in FIG. 5, the plurality of first piezoelectric elements extend preferably radially from a center of the top face and are arranged around the center.

FIG. 6A to FIG. 6B and FIG. 7A to FIG. 7B illustrate arrangements of second magnets on a piezoelectric element of a first piezoelectric energy generator module according to one embodiment of the present disclosure.

Figure 6A:
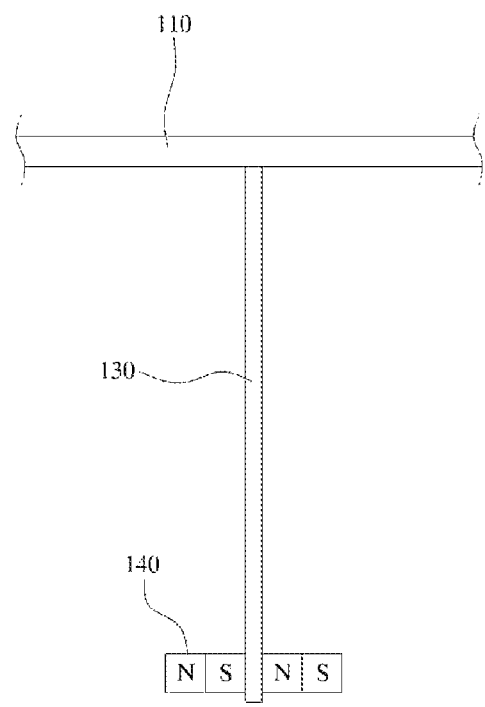
FIG. 6A to FIG. 6B and FIG. 7A to FIG. 7B illustrate arrangements of second magnets on a piezoelectric element of a first piezoelectric energy generator module according to one embodiment of the present disclosure.
Figure 6B:
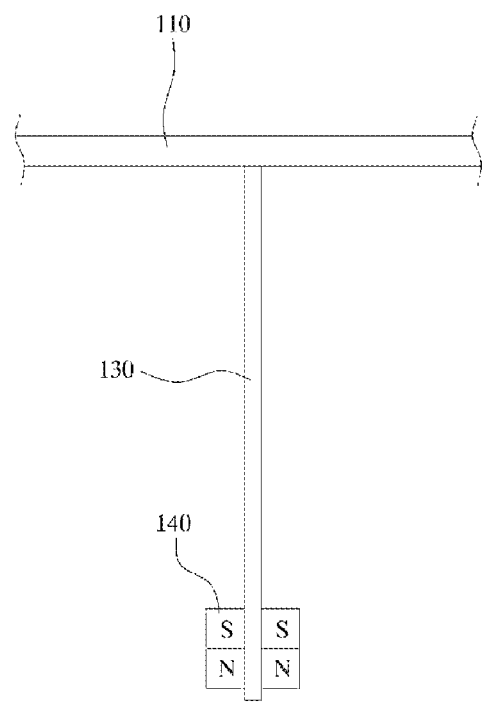

In FIG. 6A, the second magnets 140 may be oriented such that the north pole and the south pole are arranged to in a perpendicular manner to one face of the piezoelectric element 130. In this case, the second magnets may be disposed on opposite faces of the piezoelectric element respectively such that the south pole of one of the second magnets faces the north pole of the other of the second magnets. However, the present disclosure is not limited thereto. The south pole of one of the second magnets faces the south pole of the other of the second magnets. In one example, as shown in FIG. 6B, the second magnet may be oriented such that the north pole and the south pole are arranged in parallel with the plane of the piezoelectric element and on one face of the piezoelectric element. The second magnets may be disposed on opposite faces of the piezoelectric element respectively such that the south pole of one of the second magnets faces the north pole of the other of the second magnets. However, the present disclosure is not limited thereto. The south pole of one of the second magnets faces the south pole of the other of the second magnets.

Figure 7A:
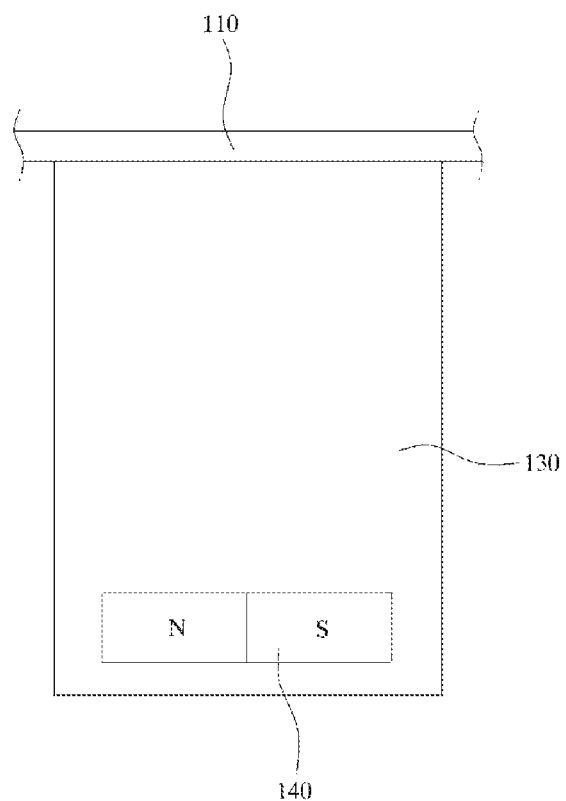
Figure 7B:
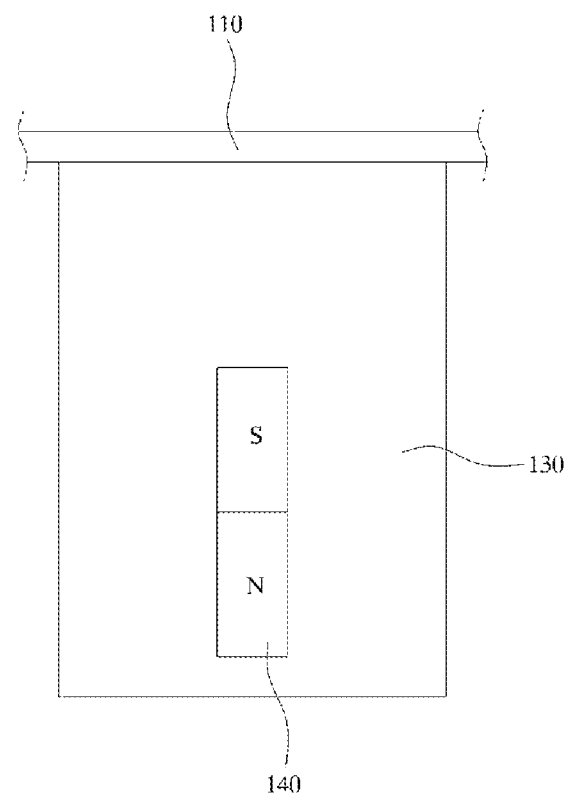

In FIG. 7A and FIG. 7B, the second magnet 140 is oriented such that the north pole and the south pole are arranged in parallel with one face of the piezoelectric element 130. FIG. 7 is a side view of the piezoelectric element of FIG. 5. As shown in FIG. 7, the second magnet may be oriented so that the N and S poles are arranged parallel to one face of the piezoelectric element. In FIG. 7A, the second magnet 140 may be oriented such that the north pole and the south pole are arranged in a horizontal manner. In one example, as shown in FIG. 7B, the second magnet may be oriented such that the north pole and the south pole are arranged vertically.

In one example, the arrangement of the first magnets and the second magnets may be configured so that the poles of the same polarity are oriented in the same direction or in a symmetry manner, or the poles of the different polarities are alternated with each other.

The light-emitter (not shown) may be formed on a top of the delineator or on an outer face of the central shaft of the delineator. The light-emitter (not shown) may be positioned such that the driver of the vehicle may view light emitted by the light-emitter. The light-emitter may be embodied as an LED, but is not limited thereto.

The second piezoelectric energy generator module 300 in accordance with the present disclosure may be placed either below the wind-powered rotatable module or above the first piezoelectric energy generator module.

The second piezoelectric energy generator module 300 generates electrical energy by one or more second piezoelectric elements extending radially from a fixed central shaft in a cantilever manner. In another example, the second piezoelectric energy generator module 300 generates electrical energy by one or more second piezoelectric elements disposed on an elastic base extending radially from a fixed central shaft in a cantilever manner.

Figure 4A:
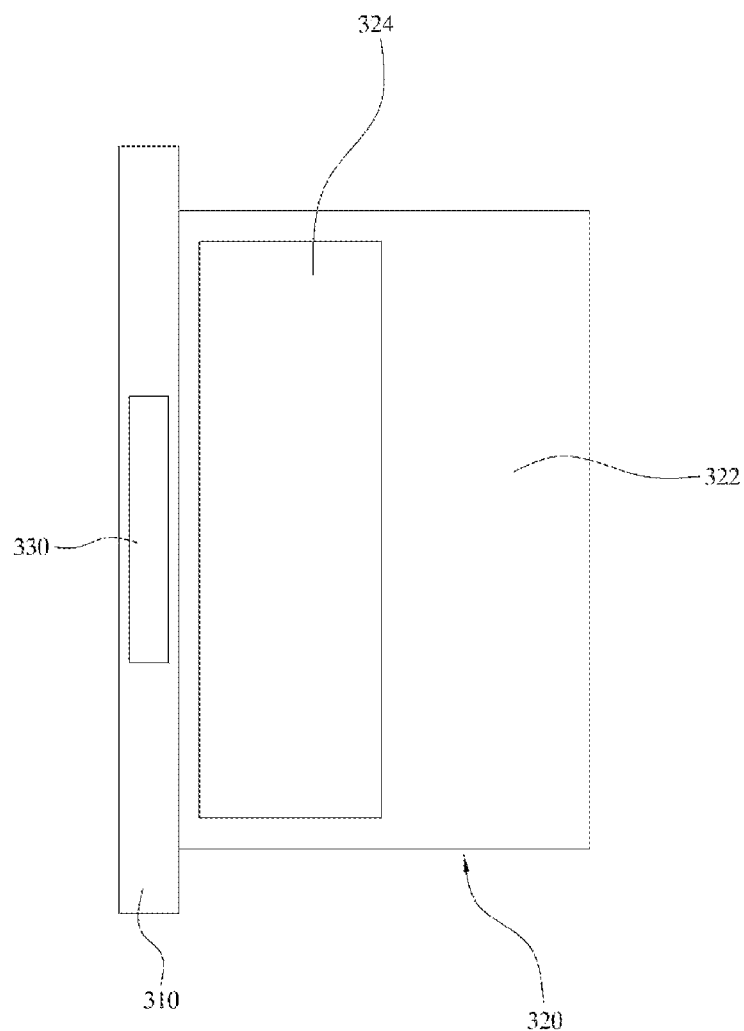
FIG. 4A and FIG. 4B show a second piezoelectric energy generator module according to one embodiment of the present disclosure.
Figure 4B:
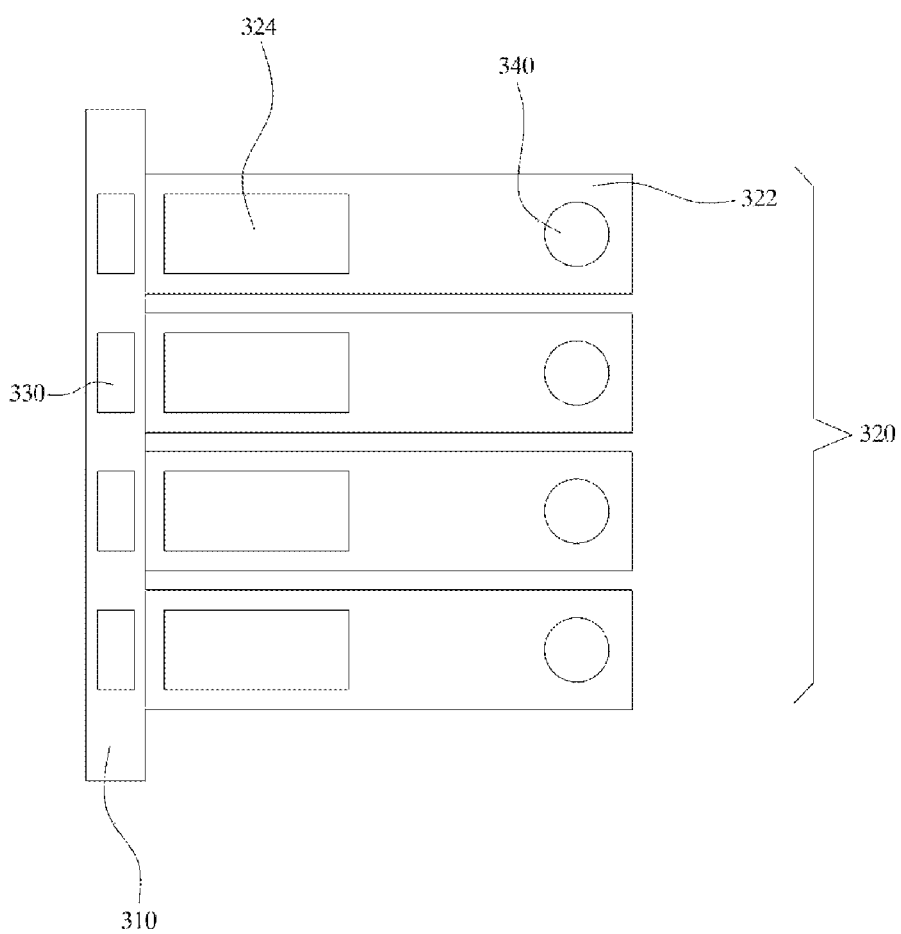

FIG. 4A and FIG. 4B show a second piezoelectric energy generator module according to one embodiment of the present disclosure.

The second piezoelectric energy generator module 300 may include a central shaft 310; at least one elastic base extending from the central shaft in a cantilever manner; an at least one second piezoelectric element 324 disposed on the at least one elastic base.

In this case, a separate light-emitter 330 may be placed on the central shaft 310.

Further, as shown in FIG. 4B, the second piezoelectric energy generator module may include a plurality of cantilever type elastic bases; and a plurality of second piezoelectric elements disposed on the plurality of elastic bases, respectively. In this case, the plurality of elastic bases may be spaced apart from each other along the vertical direction of the central shaft. In FIG. 4B, four bases may be arranged along the vertical direction.

In one example, a plurality of light-emitters 330 may be further disposed on the central shaft 310. In this case, the number of light-emitters 330 may correspond to the number of second piezoelectric elements 324. Terminals of the second piezoelectric elements on the plurality of cantilever type elastic bases may be connected to the plurality of light-emitters respectively. Thus, each light-emitter electrically connected to each piezoelectric element on each cantilever type base may be powered via vibrating each cantilever type base. That is, each corresponding light-emitter 330 may emit light using electricity generated by each second piezoelectric element 324.

In one example, in this case, an insulating film is placed on each elastic base for one-to-one correspondence between each second piezoelectric element and each light-emitter. Preferably, an electrode pattern is formed on the insulating film so that a terminal of each second piezoelectric element may be connected to each light-emitter. In this manner, the second piezoelectric energy generator module and the light-emitter may be combined in a modular fashion.

Further, as shown in FIG. 4B, a mass may be placed at an end of each elastic base to increase vibration as caused by wind power. In some cases, ends of the plurality of elastic members may be connected to each other to share vibration energy caused by wind power.

The self-powered delineator including the light-emitter according to the present disclosure may be turned on using the electric energy generated from the first piezoelectric element or the second piezoelectric element. In this case, the light-emitter may be turned on immediately without storing electrical energy. Energy may be stored and used in the dark, such as at night.

When the self-powered delineator collect sand uses energy, the self-powered delineator may further include a rectifier circuit and an energy storage. A diode may be disposed as the rectifying circuit in the piezoelectric element. Each rectifying diode may be individually connected to each of the plurality of piezoelectric elements. When there are a plurality of piezoelectric elements, each rectifying diode may be individually connected to each piezoelectric element. The plurality of piezoelectric elements may be connected in parallel with each other and connected to one external output terminal. In some cases, the plurality of piezoelectric elements may be connected in series with each other. In this case, the energy storage may be connected to the external output terminal. The energy storage may store energy. Thus, when the delineator may use the stored energy when necessary. In other words, each piezoelectric element is connected to an outside via each electrode. In this case, piezoelectric elements are connected in series or in parallel with each other and are connected to one external output terminal. The energy storage is connected to the light-emitter and supplies electric energy to the light-emitter as needed, thereby turning on the light-emitter.

The description of the presented embodiments is provided to enable any person of ordinary skill in the art to make or use the present disclosure. Various modifications to these embodiments will be apparent to those of ordinary skill in the art of the present disclosure. The general principles defined herein may be applied to other embodiments without departing from the scope of the present disclosure. Thus, the present disclosure should not be limited to the embodiments as presented herein but should be interpreted in the broadest scope consistent with the principles and novel features presented herein.

What is claimed is:

1. A self-powered delineator comprising:
   a wind-powered rotatable module;
   a first piezoelectric energy generator module for generating electrical energy, wherein the first piezoelectric energy generator module is disposed above the wind-powered rotatable module;
   a second piezoelectric energy generator module for generating electrical energy; and
   a light-emitter,
   wherein the wind-powered rotatable module includes:
      a first top portion;
      a rotation shaft coupled to the first top portion;
      one or more rotating blades radially extending from the rotation shaft, wherein the blades are rotatable by wind power to rotate the rotation shaft; and
      one or more first magnets spacedly arranged around the rotation shaft and disposed on the first top portion,
   wherein the first piezoelectric energy generator module includes:
      a second top portion;
      one or more first piezoelectric elements, each first piezoelectric element extending downwardly from the second top portion in a cantilever manner; and
      one or more second magnets disposed on the at least one first piezoelectric element,
   wherein the second piezoelectric energy generator module includes:
      a fixed shaft;
      at least one elastic base extending radially from the fixed shaft in a cantilever manner; and
      at least one second piezoelectric element on the at least one elastic base,
   wherein the light-emitter is electrically connected to the first piezoelectric element and/or the second piezoelectric element such that the light-emitter is turned on using electrical energy generated from the first piezoelectric element and/or the second piezoelectric element.

2. The self-powered delineator of claim 1, wherein the at least one first magnet includes a plurality of the first magnets, wherein each first magnet is oriented such that a north pole and a south pole thereof are arranged vertically or horizontally on the first top portion.

3. The self-powered delineator of claim 1, wherein the at least one first piezoelectric element includes a plurality of first piezoelectric elements spacedly arranged around a center of the second top portion, wherein each first piezoelectric element extends radially from the center of the second top portion.

4. The self-powered delineator of claim 1, wherein each second magnet is oriented such that a N pole and a S pole thereof are arranged vertically on one face or opposite faces of each first piezoelectric element.

5. The self-powered delineator of claim 1, wherein each second magnet is oriented such that a N pole and a S pole thereof are arranged horizontally on one face or opposite faces of each first piezoelectric element.

6. The self-powered delineator of claim 1, wherein each elastic base is divided into a plurality of sub elastic bases vertically arranged to be spaced apart from each other, wherein each piezoelectric element includes a plurality of second sub piezoelectric elements, each disposed on each sub elastic base.

7. The self-powered delineator of claim 6, wherein a plurality of further light-emitters are disposed on the fixed shaft, wherein each further light emitter is electrically connected to each second sub piezoelectric element, wherein when each sub elastic base is vibrated in a cantilever manner, each further light emitter is turned on.

8. The self-powered delineator of claim 7, wherein an insulating film is disposed on each sub elastic base, wherein an electrode pattern is formed on the insulating film to electrically connect each second sub piezoelectric element to each further light-emitter.

9. A self-powered delineator comprising:
   a wind-powered rotatable module;
   a first piezoelectric energy generator module for generating electrical energy, wherein the first piezoelectric energy generator module is disposed below the wind-powered rotatable module;
   a second piezoelectric energy generator module for generating electrical energy; and
   a light-emitter,
   wherein the wind-powered rotatable module includes:
      a first bottom portion;
      a rotation shaft coupled to the bottom portion;
      one or more rotating blades radially extending from the rotation shaft, wherein the blades are rotatable by wind power to rotate the rotation shaft; and
      one or more first magnets spacedly arranged around the rotation shaft and disposed on the bottom portion,
   wherein the first piezoelectric energy generator module includes:
      a second bottom portion;
      one or more first piezoelectric elements, each first piezoelectric element extending upwardly from the second bottom portion in a cantilever manner; and
      one or more second magnets disposed on the at least one first piezoelectric element,
   wherein the second piezoelectric energy generator module includes:
      a fixed shaft;
      at least one elastic base extending radially from the fixed shaft in a cantilever manner; and
      at least one second piezoelectric element on the at least one elastic base,
   wherein the light-emitter is electrically connected to the first piezoelectric element and/or the second piezoelectric element such that the light-emitter is turned on using electrical energy generated from the first piezoelectric element and/or the second piezoelectric element.

10. The self-powered delineator of claim 9, wherein the at least one first magnet includes a plurality of the first magnets, wherein each first magnet is oriented such that a north pole and a south pole thereof are arranged vertically or horizontally on the first bottom portion.

11. The self-powered delineator of claim 9, wherein the at least one first piezoelectric element includes a plurality of first piezoelectric elements spacedly arranged around a center of the second bottom portion, wherein each first piezoelectric element extends radially from the center of the second bottom portion.

12. The self-powered delineator of claim 9, wherein each second magnet is oriented such that a N pole and a S pole thereof are arranged vertically on one face or opposite faces of each first piezoelectric element.

13. The self-powered delineator of claim 9, wherein each second magnet is oriented such that a N pole and a S pole thereof are arranged horizontally on one face or opposite faces of each first piezoelectric element.

14. The self-powered delineator of claim 9, wherein each elastic base is divided into a plurality of sub elastic bases vertically arranged to be spaced apart from each other, wherein each piezoelectric element includes a plurality of second sub piezoelectric elements, each disposed on each sub elastic base.

15. The self-powered delineator of claim 14, wherein a plurality of further light-emitters are disposed on the fixed shaft, wherein each further light emitter is electrically connected to each second sub piezoelectric element, wherein when each sub elastic base is vibrated in a cantilever manner, each further light emitter is turned on.

16. The self-powered delineator of claim 15, wherein an insulating film is disposed on each sub elastic base, wherein an electrode pattern is formed on the insulating film to electrically connect each second sub piezoelectric element to each further light-emitter.

* * * * *